(12) United States Patent
Eyal et al.

(10) Patent No.: US 12,044,557 B2
(45) Date of Patent: Jul. 23, 2024

(54) INTERROGATION OF ARRAYS OF EQUALLY SPACED WEAK REFLECTORS IN OPTICAL FIBERS

(71) Applicant: TECHNOLOGY INNOVATION MOMENTUM FUND (ISRAEL) LIMITED PARTNERSHIP, Tel Aviv (IL)

(72) Inventors: Avishay Eyal, Givat Shmuel (IL); Nadav Arbel, Ramat Gan (IL); Shaul Ozeri, Tel Aviv (IL)

(73) Assignee: RAMOT AT TEL AVIV UNIVERSITY LTD., Tel Aviv (IL)

( * ) Notice: Subject to any disclaimer, the term of this patent is extended or adjusted under 35 U.S.C. 154(b) by 342 days.

(21) Appl. No.: 17/604,455

(22) PCT Filed: Jun. 15, 2020

(86) PCT No.: PCT/IB2020/055567
§ 371 (c)(1),
(2) Date: Oct. 18, 2021

(87) PCT Pub. No.: WO2021/001710
PCT Pub. Date: Jan. 7, 2021

(65) Prior Publication Data
US 2022/0178723 A1    Jun. 9, 2022

Related U.S. Application Data

(60) Provisional application No. 62/869,581, filed on Jul. 2, 2019.

(51) Int. Cl.
G01D 5/353    (2006.01)

(52) U.S. Cl.
CPC ............... *G01D 5/35316* (2013.01)

(58) Field of Classification Search
None
See application file for complete search history.

(56) References Cited

U.S. PATENT DOCUMENTS

| 3,645,603 A | 2/1972 | Smith |
| 4,086,484 A | 4/1978 | Steensma |

(Continued)

FOREIGN PATENT DOCUMENTS

| CA | 2259184 A1 | 1/1998 |
| EP | 0178045 A1 | 4/1986 |

(Continued)

OTHER PUBLICATIONS

U.S. Appl. No. 17/286,467 Office Action dated May 9, 2023.
(Continued)

*Primary Examiner* — Chad H Smith
(74) *Attorney, Agent, or Firm* — KLIGLER & ASSOCIATES PATENT ATTORNEYS LTD.

(57) ABSTRACT

A method includes generating a sequence of multiple optical pulses, for transmission into an optical fiber (12) having an array of multiple equally spaced reflectors (14) embedded therein, the sequence having a pulse duration and a pulse repetition interval (PRI) that guarantee that reflections of any of the optical pulses from any of the reflectors do not overlap. The sequence of optical pulses is transmitted into the optical fiber. The reflections of the optical pulses from the reflectors are extracted from the optical fiber. One or more events affecting the optical fiber are identified by analyzing the reflections.

12 Claims, 3 Drawing Sheets

(56) References Cited

U.S. PATENT DOCUMENTS

| | | |
|---|---|---|
| 4,468,091 A | 8/1984 | Schmadel et al. |
| 4,588,296 A | 5/1986 | Cahill et al. |
| 4,684,215 A | 8/1987 | Shaw et al. |
| 5,866,898 A * | 2/1999 | Hodgson ............ G01D 5/35383 356/478 |
| 6,418,255 B1 | 7/2002 | Maier |
| 7,580,184 B2 | 8/2009 | Shu et al. |
| 7,587,110 B2 | 9/2009 | Singh et al. |
| 7,697,795 B2 | 4/2010 | Heatley et al. |
| 8,687,927 B2 | 4/2014 | Grosso et al. |
| 9,036,951 B2 | 5/2015 | Bhave et al. |
| 9,240,262 B1 | 1/2016 | Challener et al. |
| 9,436,061 B2 | 9/2016 | Nakamura et al. |
| 10,598,969 B2 | 3/2020 | Eyal et al. |
| 11,187,925 B2 | 11/2021 | Eyal et al. |
| 2005/0120796 A1 | 6/2005 | Nash et al. |
| 2007/0116408 A1 | 5/2007 | Eberle et al. |
| 2007/0264012 A1 | 11/2007 | Heatley et al. |
| 2008/0166120 A1 | 7/2008 | Heatley et al. |
| 2008/0219093 A1 | 9/2008 | Heatley et al. |
| 2009/0126162 A1 | 5/2009 | Head et al. |
| 2011/0109898 A1 | 5/2011 | Froggatt et al. |
| 2013/0113629 A1 | 5/2013 | Hartog et al. |
| 2013/0301031 A1 | 11/2013 | Manzke et al. |
| 2013/0308137 A1 | 11/2013 | Manzke et al. |
| 2013/0325387 A1 | 12/2013 | Manzke et al. |
| 2014/0326860 A1 | 11/2014 | Choi et al. |
| 2015/0015879 A1 | 1/2015 | Papadopoulos et al. |
| 2015/0233236 A1 | 8/2015 | Johnston |
| 2016/0003648 A1 | 1/2016 | Barfoot et al. |
| 2016/0157939 A1 | 6/2016 | Larkin et al. |
| 2016/0242854 A1 | 8/2016 | Grass et al. |
| 2017/0010385 A1 | 1/2017 | Englich et al. |
| 2017/0017075 A1 | 1/2017 | Reddy et al. |
| 2017/0248480 A1 | 8/2017 | Dong et al. |
| 2018/0128600 A1 | 5/2018 | T Hooft |
| 2019/0173587 A1 | 6/2019 | Hendrickson et al. |
| 2020/0116923 A1 | 4/2020 | Froggatt et al. |
| 2021/0088408 A1 | 3/2021 | Murray et al. |
| 2021/0389163 A1 | 12/2021 | Eyal et al. |

FOREIGN PATENT DOCUMENTS

| | | |
|---|---|---|
| GB | 2385416 A | 8/2003 |
| GB | 2492068 A | 12/2012 |
| WO | 0028352 A2 | 5/2000 |
| WO | 2015056012 A1 | 4/2015 |
| WO | 2017099740 A1 | 6/2017 |
| WO | 2017203271 A1 | 11/2017 |
| WO | WO-2017203271 A1 * | 11/2017 |
| WO | 2018011656 A1 | 1/2018 |

OTHER PUBLICATIONS

Tadesse et al., "Sub-optical wavelength acoustic wave modulation of integrated photonic resonators at microwave frequencies", Nature Communications, pp. 1-7, Nov. 17, 2014.

Ulbricht et al., "Elucidating gigahertz acoustic modulation of extraordinary optical transmission through a two-dimensional array of nano-holes", Applied Physics Letters, vol. 110, pp. 091910-091910-5, Mar. 2, 2017.

Freedman et al., "Perfect Periodic Correlation Sequences", Signal Processing, vol. 41, pp. 165-174, year 1995.

International Application # PCT/IB2020/055567 Search Report dated Oct. 11, 2020.

Lan et al., "Robust Compressive Multimode Fiber Imaging against Bending with Enhanced Depth of Field," Optics Express, vol. 27, No. 9, pp. 1-6, year 2019.

Li et al., "Compressively Sampling the Optical Transmission Matrix (TM) of a Multimode Fiber," Light: Science & Applications, Open Access, pp. 1-15, year 2021.

Resisi et al., "Image Transmission Through a Dynamically Perturbed Multimode Fiber by Deep Learning," Laser and Photonics Reviews, Wiley-VCH GmbH, pp. 1-7, year 2021.

FBGS Technologies GmbH, "Shape Sensing," pp. 1-8, last update Apr. 18, 2021, as downloaded from https://web.archive.org/web/20210418115825/https://fbgs.com/solutions/shape-sensing/.

Gu et al., "Design of Flexible Multi-mode Fiber Endoscope," Optics Express, vol. 23, No. 21, pp. 1-14, year 2015.

Farahi et al., "Dynamic Bending Compensation while Focusing Through a Multimode Fiber," Optics Express, vol. 21, No. 19, pp. 1-11, year 2013.

EP Application # 19896564.2 Search Report dated Jul. 27, 2022.

International Application # PCT/IB2022/054510 Search Report dated Aug. 30, 2022.

* cited by examiner

INTERROGATION OF ARRAYS OF EQUALLY SPACED WEAK REFLECTORS IN OPTICAL FIBERS

CROSS-REFERENCE TO RELATED APPLICATIONS

This application is U.S. National Phase of PCT Application PCT/IB2020/055567, filed Jun. 15, 2020, which claims the benefit of U.S. Provisional Patent Application 62/869,581, filed Jul. 2, 2019. The disclosures of these related applications are incorporated herein by reference.

FIELD OF THE INVENTION

The present invention relates generally to sensor networks, and particularly to methods and systems for acquisition and analysis of acoustical signals coupled to an optical cable.

BACKGROUND OF THE INVENTION

Various techniques are known in the art for using an optical fiber as a sensor. For example, U.S. Patent Application Publication 2017/0248480 describes a serial weak fiber Bragg grating (FBG) interrogator. The serial weak FBG interrogator may include a CW tunable laser or pulsed laser utilized as a laser source and an EDFA. The serial weak FBG interrogator may include a single CW DFB laser that illuminates a single sensor, the sensor may be an interferometer sensor, an extrinsic Fabry-Perot interferometer or a wavelength-modulated sensor. In case of a FBG sensor array, the FBGs may have an equal or non-equal spatial interval between each two neighboring FBGs. The serial weak FBG interrogator may also include a computer system or CSPU.

SUMMARY OF THE INVENTION

An embodiment of the present invention that is described hereinafter provides a method including generating a sequence of multiple optical pulses, for transmission into an optical fiber having an array of multiple equally spaced reflectors embedded therein, the sequence having a pulse duration and a pulse repetition interval (PRI) that guarantee that reflections of any of the optical pulses from any of the reflectors do not overlap. The sequence of optical pulses is transmitted into the optical fiber. The reflections of the optical pulses from the reflectors are extracted from the optical fiber. One or more events affecting the optical fiber are identified by analyzing the reflections.

In some embodiments, the array consists of N reflectors having a temporal round-trip spacing $T_a$ between adjacent reflectors, and wherein generating the sequence includes setting the pulse duration to $\tau=T_a/(N-1)$ or to $\tau=T_a/(N+1)$, and setting the PRI to $N \cdot \tau$.

In some embodiments, generating the sequence includes generating each of the optical pulses as one of a rectangular pulse, a raised-cosine pulse and a Gaussian pulse.

In other embodiments, generating the sequence includes generating each of the optical pulses as an antipodal perfect periodic autocorrelation (PPA) sequence, wherein extracting the reflections includes correlating the reflections with the antipodal PPA sequence, and wherein the pulse duration and the PRI guarantee no overlap among the correlated reflections.

In yet other embodiments, generating the sequence includes setting a number of bits in the antipodal PPA sequence to be at least the number of reflectors in the array.

In an embodiment, the optical fiber includes at least first and second cores, wherein transmitting the sequence includes transmitting the sequence into the first core at a given end of the optical fiber, wherein extracting the reflections includes extracting the reflections from the second core at the same given end of the optical fiber, and wherein the array includes at least (i) a first reflector embedded in the first core and configured to reflect the optical pulses arriving from the given end, from the first core to the second core, and (ii) a second reflector embedded in the second core and configured to reflect the pulses arriving from the first core to propagate in the second core toward the same given end of the optical fiber.

In another embodiment, identifying the events includes, for a given event, identifying a reflector associated with the given event.

There is further provided, in accordance with another embodiment of the present invention, a system including an optical transmitter, an optical receiver, and a processor. The optical transmitter is configured to generate a sequence of multiple optical pulses, for transmission into an optical fiber having an array of multiple equally spaced reflectors embedded therein, the sequence having a pulse duration and a pulse repetition interval (PRI) that guarantee that reflections of any of the optical pulses from any of the reflectors do not overlap, and to transmit the sequence of optical pulses into the optical fiber. The optical receiver is configured to extract, from the optical fiber, the reflections of the optical pulses from the reflectors. The processor is configured to identify one or more events affecting the optical fiber by analyzing the reflections.

There is additionally provided, in accordance with another embodiment of the present invention, an optical fiber including a first core, a second core, and an array of equally spaced optical reflectors. The first core is configured to receive light at a given end of the optical fiber. the second core is configured to output light at the same given end of the optical fiber. The an array of equally spaced optical reflectors includers one or more pairs of reflectors, each pair including (i) a first reflector embedded in the first core and configured to reflect light arriving from the given end, from the first core to the second core, and (ii) a second reflector embedded in the second core and configured to reflect the light arriving from the corresponding first reflector in the first core to propagate in the second core toward the same given end of the optical fiber.

The present invention will be more fully understood from the following detailed description of the embodiments thereof, taken together with the drawings in which:

DETAILED DESCRIPTION OF EMBODIMENTS

Overview

A fiber optic that carries light having a wavelength of ~1 micrometer is sensitive to even minute strains on the order of sub micrometers. Therefore, optical fibers may be used to detect acoustical signals and vibrations over tens or even hundreds of kilometers in a technique commonly referred to as quasi-distributed acoustic sensing (Q-DAS). Q-DAS may achieve long-haul acoustic and vibration sensing using an array of weak optical reflectors incorporated into the fiber. Such an array may be implemented by forming fiber Bragg gratings (FBGs) in the fiber core. The FBGs are typically configured to reflect a narrow band of optical frequencies. The FBGs comprised in the array may all be chosen with the same center wavelength, $\lambda_0$, low reflectivity (<1%), and a relatively wide reflection band (e.g., on the order of ($\lambda_0$/10000-$\lambda_0$/1000), or 0.1-1 nm for a wavelength of ~1 micrometer, where the wider bandwidth, e.g., of 1 nm, will provide more resilience to temperature variations.

The main advantage of FBG-based Q-DAS technique, over, for example, a Rayleigh back-scattering based technique, is that the reflections can be readily designed to be sufficiently strong to offer uniform and deterministic performance along the fiber. In Q-DAS, an optical interrogation waveform is periodically launched into the fiber, and the back-reflected optical signal is measured. Any acoustical signals modulated onto the back-reflected optical signal are extracted from its amplitude and/or phase. The interrogating signals may comprise single pulses (optical time domain reflectometry: OTDR), a periodic sequence of pulses (optical code domain reflectometry: OCDR), or frequency sweeps (optical frequency domain reflectometry: OFDR). Regardless of the interrogation method, the maximum rate with which the fiber can be interrogated is given by:

$$f_s^{max} = \frac{c}{2Ln} = \frac{v}{2L}, \quad \text{Eq. 1}$$

where c is the speed of light, n the index of refraction in the fiber, and L is the fiber length. This limit is a result of the round trip time of the light in the fiber. To avoid ambiguity, a waveform can be launched into the fiber only after the previous waveform has propagated to the fiber end and its back-reflected signal has made it back to the interrogator. For example, for L=100 km of a fiber, the maximum rate is 1 KHz (1 mSec round trip time).

For Q-DAS systems, the scan rate (update rate of the measured back-reflection profiles) is of major importance, since it determines the maximum bandwidth of the signals which can be measured without aliasing. The inverse of this rate is named hereinafter "scan period," also referred to hereinafter as the pulse repetition interval (PRI).

Methods to overcome the rate limit may be based on the use of frequency domain techniques. For example, sending pulses with different carrier frequencies may increase the scan rate. One drawback to these methods is their complexity. Using different carrier frequencies requires a state-of-the-art synthesizer that can rapidly switch between them.

Embodiments of the present invention that are described herein provide improved methods to overcome the fundamental scan rate limit (Eq. 1) even when using only a single carrier wavelength. In some embodiments, the solution is based on arrays of weak reflectors (Q-DAS) interrogated by a single optical pulse (OTDR) or by a sequence of optical pulses (OCDR). The disclosed methods are also applicable to optical frequency domain reflectometry (OFDR) in which a repetition rate can be defined as the inverse of a sweeping time to return to a same optical frequency. For example, for the L=100 km of a fiber comprising an array of N equally spaced reflectors, the maximum rate can be increased from 1 KHz to N KHz using OTDR, OFDR or OCDR, with OFDR and OCDR further providing a significant increase in signal to noise ratio (SNR) over that achievable with OTDR.

The disclosed methods extract, from the optical fiber, the reflections of the optical pulses from the reflectors, and identify one or more events affecting the optical fiber by analyzing the reflections. In some embodiments, identifying the events includes, for a given event, identifying a reflector associated with the given event.

In the disclosed embodiments, relations between the parameters for getting the desired non-overlapping back-reflection response are exactly defined. Hence, the disclosed method enables the design of a Q-DAS system analytically to fit given requirements, with no need to run a simulation. To this end, the disclosed embodiments consider interrogation of an array of N equally spaced reflectors as a sufficient assumption for OTDR, in order to be able to analytically analyze and design such.

As noted above, a technique to increase SNR is to use a sequence of M pulses (OCDR), with M≥N. In the disclosed OCDR technique, the multiple pulses are phase coded using a binary antipodal phase-shift keying (PSK) code. Binary PSK codes are pseudorandom sequences whose elements are taken from the basic set {−1, +1}. A property of these codes utilized by the disclosed technique is that they can become perfect periodic autocorrelation (PPA) codes when their basic set is replaced by {$e^{j\varphi}$, +1}, with φ taken as:

$$\varphi = \cos^{-1}\left(\frac{M-1}{M+1}\right) \quad \text{Eq. 2}$$

As seen in Eq. 1, as M increases (e.g., M>50), φ approaches approximately π and the code approaches its antipodal version {−1, +1}.

As used herein, the term "approximately" for any numerical value or range indicates a suitable dimensional tolerance that allows the part or collection of components to function for its intended purpose as described herein. More specifically, "approximately" may refer to the range of values −10% of the recited value, e.g. "approximately 100%" may refer to the range of values from 90% to 100%.

In an embodiment, M=N, which, given a proper selection of the pulse width, maximizes the SNR, assuming N is large enough (e.g., N>50), for φ to approach approximately π and the code to approach its antipodal version. As noted above, generally the number of M pulses ("bits") in each PPA sequence can be greater than or equal to the number of reflectors N in the array. Using larger number sequences of pulses, i.e., M>N, is beneficial in case of a small number of reflectors (e.g., N=10), despite requiring reducing pulse width and thereby SNR associated with a single pulse, as it improves the overall SNR and simplifies the system design.

Another fundamental limitation of Q-DAS systems is a background signal due to Rayleigh backscattering in the fiber, which causes a fraction of the energy of a waveform that is launched into the fiber to be backscattered to an interrogator due to imperfections in the fiber core. The spatial distribution of light which is backscattered is random, and this may lead to a low and non-uniform background signal, including locations where no weak reflectors are placed, which may cause a so-called "Rayleigh noise" that may degrade SNR.

In some embodiments, the reflectors are implemented in the link using fiber Bragg gratings (FBG). As an example, consider a system with a total length of 500 km and an FBG every 5 km. The reflection coefficient of each FBG can be designed to compensate for the round-trip loss in the fiber. Namely, the reflection coefficient of the FBG is designed to be $R_n = R_{n-1} e^{2\alpha \Delta L}/(1-R_{n-1})$, where $\alpha$ is the attenuation coefficient of the fiber and $\Delta L$ is the distance between FBGs. The first reflection coefficient, $R_I$, is chosen to be sufficiently small in order to reduce the effect of multiple scattering. For example, $R_I$ can be chosen to be ~0.5%. Even at this low value the FBG reflection is orders of magnitude stronger than the Rayleigh backscatter level.

Other embodiments of the present invention provide a dual-core fiber comprising tilted reflectors, such as tilted FBGs, where each pair of tilted reflectors at a given location on the fiber generates a reflectivity having a greatly suppressed Rayleigh scatter amplitude (e.g., $2^{nd}$ order compared with $1^{st}$ order in a single core fiber). The disclosed dual reflector geometry is therefore configured to overcome Rayleigh noise. In an embodiment, a first core of the dual-core fiber is configured to receive light at a given end of the optical fiber, while the second core is configured to output light at the same given end of the optical fiber. The dual-core fiber includes an array of equally spaced optical reflectors, including one or more pairs of reflectors, each pair including (i) a first reflector embedded in the first core and configured to reflect light arriving from the given end, from the first core to the second core, and (ii) a second reflector embedded in the second core and configured to reflect the light arriving from the corresponding first reflector in the first core to propagate in the second core toward the same given end of the optical fiber.

By providing time-domain optimized optical interrogation methods of equidistant weak reflectors in optical fibers, and by optionally overcoming Rayleigh backscatter noise using a dual-core fiber, the disclosed techniques may improve autonomous sensing capabilities of a sensing system deployed, for example, in extreme ambient environments.

System Description

Figure 1:
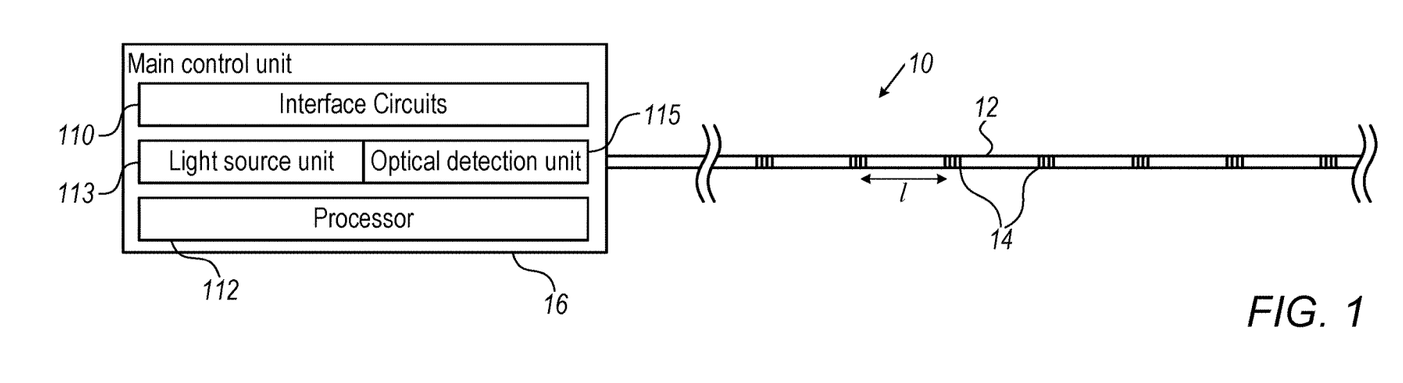
FIG. 1 is a block diagram that schematically illustrates a fiber-optic based sensor system, in accordance with an embodiment of the present invention.

FIG. 1 is a block diagram that schematically illustrates a fiber-optic based sensor system 10, in accordance with an embodiment of the present invention. Systems such as system 10 can be used in any suitable field or application that involves data collection from sensors. Several non-limiting examples include networks of perimeter intrusion detection sensors; transportation-related sensor systems such as along railways, roads, or tunnels; energy-related sensor networks such as in power stations, oil rigs, or gas fields; and/or geophone sensor networks used in seismology, to name just a few.

In the shown embodiment, system 10 comprises an optical fiber 12 comprising an array of equally spaced (by a length "/") FBG sensors 14 that weakly reflect trains of optical pulses propagating in fiber 12, thereby generating reflected (e.g., backward propagating) optical pulses in fiber 12.

A main control unit 16 comprises interface circuits 110, a processor 112, a light source unit 113, and an optical detection unit 115. Interface circuits 110 are configured, for example, for external communication, for receiving configuration parameters from a remote user, and for outputting information of events identified by processor 112 analyzing electronic signals that detection unit 115 outputted in response to detecting reflection from FBG sensors 14.

Different elements of main control unit 16 may be implemented using suitable hardware, such as discrete components, one or more application-specific integrated circuits (ASICs) or field-programmable gate arrays (FPGAs), or in any other suitable way. In some embodiments, some elements of the main control unit may be implemented using software, or using a combination of hardware and software elements. Elements of the main control unit that are not relevant to understanding the disclosed techniques have been omitted from the figure for the sake of clarity.

Figure 2:
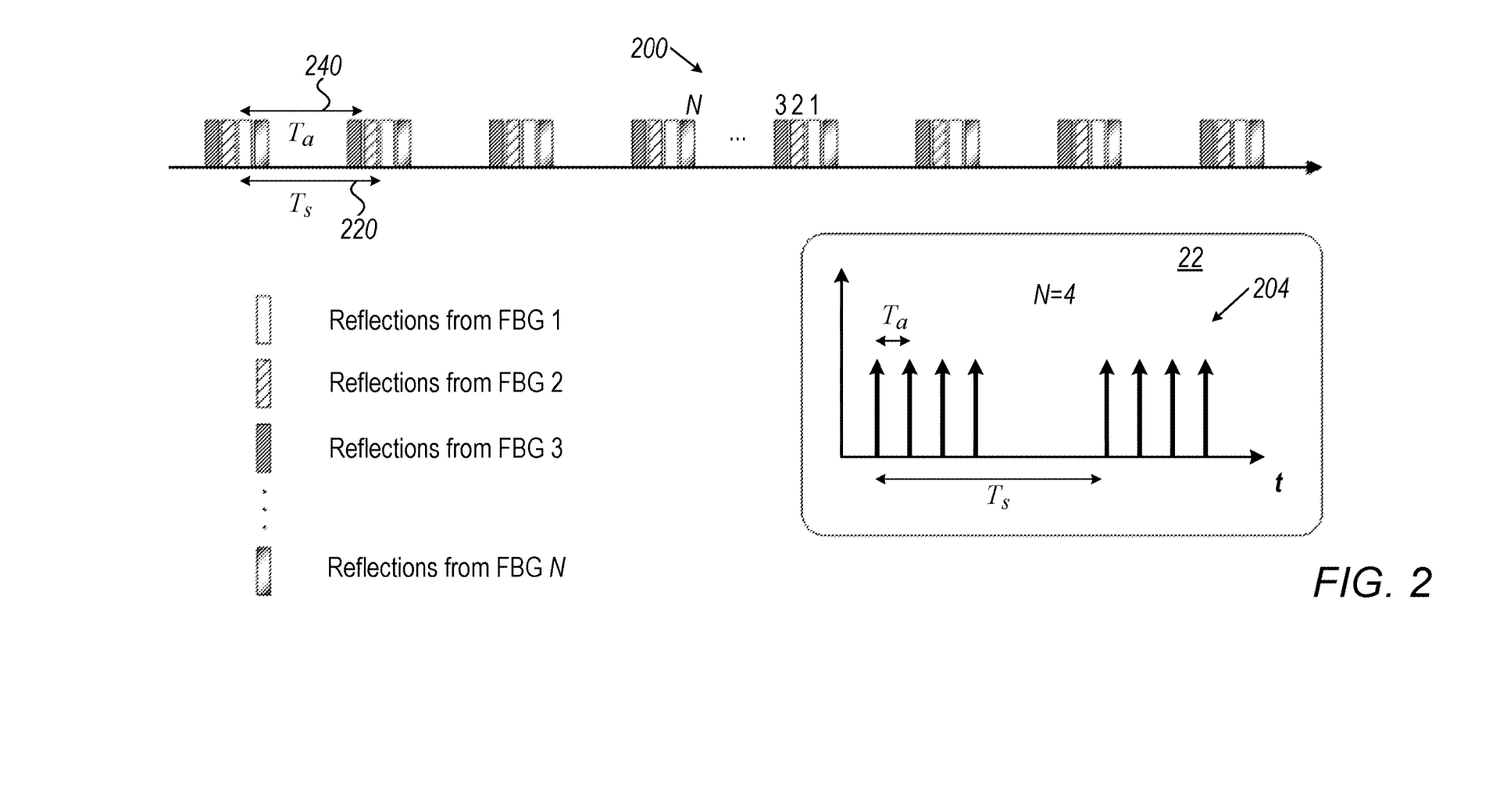
FIG. 2 is block diagram that schematically illustrates a sequence of back-reflected pulses in a single-pulse optical time domain reflectometry (OTDR) interrogation scheme of the sensors of the system of FIG. 1, in accordance with an embodiment of the present invention.

Overcoming Fundamental Limits in Q-Das Using a Single Pulse Interrogation Scheme FIG. 2 is block diagram that schematically illustrates a sequence 200 of back-reflected pulses in a single pulse optical time domain reflectometry (OTDR) interrogation scheme of the sensors of system 10 of FIG. 1, in accordance with an embodiment of the present invention.

An embodiment of the present invention overcomes the fundamental limit in a Q-DAS system and OTDR interrogation by a judicious choice of a pulse duration, $\tau$, and a scan period, $T_s$, for a given number of reflectors, N, and the spacing between them (spatial period), l. $T_s$ is also referred herein as the pulse repetition interval (PRI) of the interrogating pulses.

A pulse duration can be defined, for example, as the pulse width at 1% of pulse maximum (i.e., pulse duration between the consecutive times where the power is 1% of the peak power).

Consider an array of N equally spaced weak reflectors with constant spatial period of l, a pulse of duration $\tau$ which is sent into the fiber that generates, in the detection unit, a sequence of N back-reflected pulses with temporal spacing of $$T_a = \frac{2l}{v}.$$

Periodic interrogation at a repetition rate of $$\frac{1}{T_s}$$

leads to back-reflected pulses with the following time delays $T_D(i, j)$:

$$T_D(i, j) = iT_s + jT_a \begin{cases} i = 0, \pm 1, \pm 2 \ldots \pm \infty \\ j = 0, +1, \ldots N-1 \end{cases} \quad \text{Eq. 3}$$

Inset 22 provides a schematic illustration for four reflectors (N=4) and two pulses sent with a single scan period $T_s$ between them, which is presented for the simple case of $T_s > NT_a$. In Inset 22, time delay $T_D$ ranges between a minimum of $T_a$ and a maximum of $T_s + 3T_a$.

Choosing $$\tau = \frac{T_a}{(N-1)}$$

and $T_s = N\tau$ gives:

$$\frac{T_D(i,j)}{\tau} = D(i,j) = iN + j(N-1) \begin{cases} i = 0, \pm 1, \pm 2 \ldots \pm \infty \\ j = 0, +1, \ldots N-1 \end{cases} \quad \text{Eq. 4}$$

where D(i,j) is a matrix containing all possible normalized delay times of back-reflected pulses. A normalized delay time $T_D$ gives the number of pulses in the interval $T_D$, which can be expressed as:

$$D(\tau, j) = iN + j \begin{cases} i = 0, \pm 1, \pm 2 \ldots \pm \infty \\ j = 0, +1, \ldots N-1 \end{cases} \quad \text{Eq. 5}$$

It can be easily proven that all the elements of matrix D of Eq. 5 are different from one another, namely, $D(\tilde{i}_1, \tilde{j}_1) = D(\tilde{i}_2, \tilde{j}_2)$ if and only if $\tilde{i}_1 = \tilde{i}_2$ and $j_1 = j_2$. This means that our choice of $\tau$ and $T_s$ ensures that back-reflected pulses will not overlap, and the reflectivities of the reflectors can be obtained with no ambiguity. As such, when detecting events that affect the fiber based on the reflections, it is possible to localize each event to a specific reflector (or to a specific section between adjacent reflectors).

There are other possible choices of $\tau$ and $T_s$ which ensure no overlap. For example, $$\tau = \frac{T_a}{(N+1)}$$

and $T_s = N\tau$ is also adequate. One possible choice of parameters, namely $$\tau = \frac{T_a}{(N-1)}$$

and $T_s = N\tau$, or $T_s - T_a = \tau$, is illustrated in FIG. 2, by reflections 200.

The two choices of parameters described above (namely, for a given fiber with N reflectors and round trip spacing of $T_a$ the first proposed design is $$\left\{ \tau = \frac{T_a}{(N-1)}, T_s = N\tau \right\}.$$

and the second being $$\left\{ \tau = \frac{T_a}{(N+1)}, T_s = N\tau \right\})$$

have the property that the backscattered light is temporally continuous and there are no dark intervals. There are, however, other valid choices of parameters which introduce no overlaps in the backscattered signal. While such choices are valid, they may introduce dark intervals in the backscattered light and are thus sub-optimal in that sense. An algorithm for obtaining such sub-optimal but valid designs is as follows:

1. Make an "optimal" design with continuous backscatter and parameters $\{N, T_a, \tau^{opt}, \tau_s^{opt}\}$
2. Choose $\tau \leq \tau^{opt}$
3. Eliminate any sub-group of reflectors from the "optimal" design. For example, reflectors may be eliminated at sections along the fiber where there is no requirement for sensing. Taking into account such eliminated reflectors (also called, "don't-care" sections) may provide a design that saves optical power and improves performance.

The algorithm is based on the observation that steps 2 and 3 cannot introduce overlap between the various reflections from the array. The condition which all valid designs need to satisfy is described below:

For a single FBG interrogated at a pulse repetition rate of $1/T_s$, a comb of reflections in time delays of $t_k^V = kT_s$ is detected, where k is any integer number in the range of $k = -\infty : \infty$ and V represents the reflector number (and such can be any integer between 1 to N), for single reflector, V=1. For a second reflector in the fiber, its detected reflections (from the same interrogator pulse) appear at delays of $t_j^U = jT_s$, where j is an integer and U is the reflector number; if j represents the $2^{nd}$ reflector, then U=2, in the general case of N FBGs: U=1: N. The fundamental requirement of the delays is to avoid overlaps for all delays originating from different reflectors. For the general case of N reflectors, the scan repetition rate $1/T_s$ should be such that $t_k^V \neq t_j^U \forall k,j$; $\forall U \neq V$.

In the above example the optical pulses are rectangular pulses. Generally, however, any other suitable pulse shape can be used, in particular pulse shapes having smaller bandwidths than a rectangular pulse. Non-limiting examples include raised-cosine pulses and Gaussian pulses.

Improving Snr in Q-Das Using Pulse-Sequence Interrogation Scheme

Figure 3:
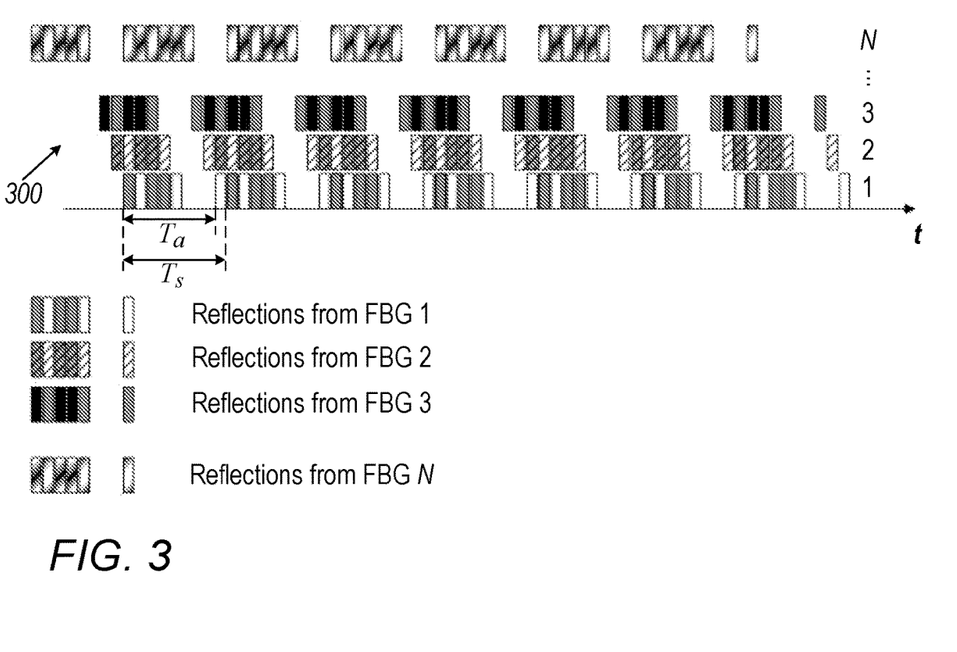
FIG. 3 is block diagram that schematically illustrates a sequence of back-reflected pulses in a periodic pulse-sequence optical code domain reflectometry (OCDR) interrogation scheme of the sensors of the system of FIG. 1, in accordance with an embodiment of the present invention.

FIG. 3 is block diagram that schematically illustrates a sequence 300 of back-reflected pulses in a periodic pulse-sequence optical code domain reflectometry (OCDR) interrogation scheme of the sensors of system 10 of FIG. 1, in accordance with an embodiment of the present invention.

As noted above, the disclosed technique uses a sequence of M pulses (OCDR) to interrogate N equally spaced reflectors, with M≥N. The method uses pseudorandom sequences whose elements are taken from the basic set $(e^{j\varphi}, +1)$, with V defined by Eq. 2, to utilize a property of these codes such that they can become perfect periodic autocorrelation (PPA) codes when M increases (e.g., M>50), and $\varphi$ approaches approximately $\pi$ so that the code approaches its antipodal version $\{-1, +1\}$.

In an embodiment, M=N, where a Legendre condition is applied such that N can be any prime number that obeys N=4k−1, where k is an integer.

As antipodal codes are simpler to implement optically (e.g., in comparison with general binary PSK codes) such antipodal codes are herein provided. The optical interrogation signal is a sequence of pulses with identical envelopes and pseudo-randomly alternating signs (Legendre sequences) which can be expressed as:

$$E_{in}(t) = \sum_{k=1}^{N} c_k E_0 a(t - kT_{bit})  \qquad \text{Eq. 6}$$

where $E_0$ is the amplitude of the optical field, $c_k$ is the code element at position k, and a(t) describes the envelope of a single pulse. The pulse envelope, which is normalized to unit energy, attains a positive value between $[-T_{bit}/2, T_{bit}/2]$ and vanishes elsewhere. Thanks to the properties of the selected code, the periodic autocorrelation of $E_{in}(t)$ is near perfect, and given by $R(\tau) \approx E_0^2 N R_a(\tau)$ where $R_a(\tau)$ is the autocorrelation of the elementary pulse. In DAS or Q-DAS, the field which is backscattered from the fiber under test (FUT) can be described as:

$$E_{FUT}(t) = \int_0^L \rho(z') E_{in}\left(t - \frac{2z'}{v_g}\right) dz'  \qquad \text{Eq. 7}$$

where $\rho(z) \approx r(z)\exp(-j2\beta z)$ is the complex backscatter coefficient of the fiber. It describes both the local backscatter complex amplitude, r(z) and the optical phase acquired by the light during its trip to point z and back. $v_g$ is the group velocity of the light and L is the total fiber length. In the case of Rayleigh scattering the local backscatter complex amplitude is assumed to be a white spatial random process, namely, $\langle r(z')r^*(z'')\rangle \propto \delta(z'-z'')$. In the case of a FBG array, r(z) describes a sequence of discrete reflections.

Optical detection of the reflected signal at the output of the fiber is done with an I/Q receiver. Then the detected signal is sampled and cross-correlated with the transmitted signal yielding the following:

$$R_{FUT}(t) = A \int_0^L \rho(z') R_a\left(t - \frac{2z'}{v_g}\right) dz'  \qquad \text{Eq. 8}$$

where A is a constant that includes parameters such as number of pulses in the code and gain of a coherent receiver. This expression can be understood as a convolution between the complex profile of the fiber and the autocorrelation of the elementary pulse. Finally, the estimated fiber profile, $R_{FUT}$ ($t=2z/v_g$), is measured repeatedly, and the DAS signal is extracted from its phase variations with position and time, as long as the temporal duration of the code is longer than the fiber round trip time.

Although the examples in this document refer to Legendre codes, the disclosed techniques can be used with other suitable pseudorandom sequences, PPA or otherwise. PPAs and their properties are discussed, for example, in "Perfect Periodic Correlation Sequences," Freedman et al., Elsevier—Signal Processing, volume 41, 1995, pages 165-174, which is incorporated herein by reference.

As in the case of OTDR, judicious choice of parameters of the interrogation sequence in OCDR ensures a very high interrogation rate without an overlap of FBG peaks. The parameters are essentially the same as in the OTDR case but, instead of transmitting a single pulse in each interrogation period, N pulses are transmitted. Hence, given an array of N weak reflectors with spacing l we make the following choice of parameters: the pulse duration is chosen to be T=/(N−1), where, again, $T_a \equiv 2l/v$ is temporal spacing between reflections of two neighboring FBGs, and the scan period (which is also the code duration) is $T_s=N\tau$.

As before, this parameter choice is just one out of several possibilities. As in the previous case, a different valid choice of parameters (with continuous backscatter and with the presence of gaps) can be used.

Unlike in the OCPR case, where the sequence duration is longer than the round-trip time, here the sequence duration is much shorter than the round-trip time, as it equals the time difference between two adjacent reflectors. As the fiber scan rate is determined solely by code duration, higher scan rates are achieved in this method compared to a standard OCPR.

The example above refers to an extreme condition in which the number of bits in each PPA sequence is equal to the number of reflectors in the array. Alternatively, however, longer sequences can also be used, and may in fact improve performance and simplify the system design. Generally, the number of bits in each PPA sequence should be greater than or equal to the number of reflectors in the array.

Figure 4:
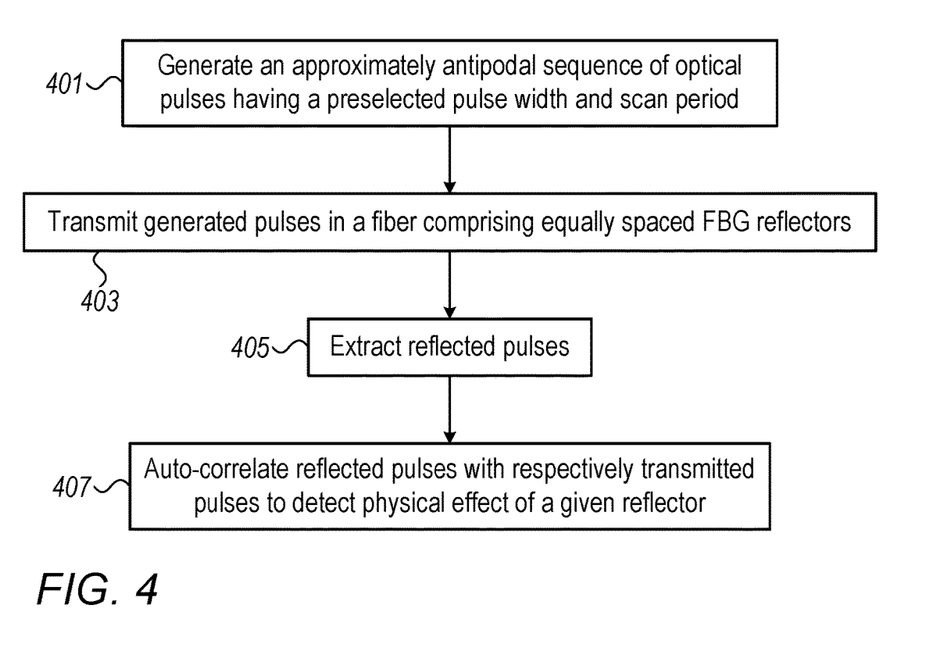
FIG. 4 is flow chart that schematically describes a method of interrogating the system of FIG. 1 using the optical code domain reflectometry (OCDR) interrogation scheme of FIG. 3, in accordance with an embodiment of the present invention.

FIG. 4 is flow chart that schematically describes a method of interrogating the system of FIG. 1 using the optical code domain reflectometry (OCDR) interrogation scheme of FIG. 3, in accordance with an embodiment of the present invention. The algorithm, according to the presented embodiment, carries out a process that begins at an interrogating pulse sequence generation step 401, with system 10 generating an approximately antipodal sequence of optical pulses having a preselected pulse width and scan period to ensure no overlap, as described in FIG. 3.

Next, system 10 transmits the generated sequence of pulse over fiber 12 having equally spaced FBG reflectors 14, at an interrogating pulse sequence transmission step 403.

At a signal extraction step 405, system 10 extracts the respectively reflected sequence of pulses that propagated back on fiber 12.

Finally, at an analysis step 407, system 10 analyzes the reflected pulses, for example, by auto-correlating these with respectively transmitted pulses, so as to detect a physical effect at a given FBG reflector location.

The flowchart of FIG. 4 is brought by way of example and is simplified to maintain clarity of presentation. Other steps may be included in the process, such as optical and/or electronic filtration. In addition, the method described by FIG. 4 is applicable to the dual-core fiber geometry described in FIG. 5, by using double reflection into a receiving fiber and analyzing similarly (e.g., using autocorrelation) the doubly reflected pulses.

Figure 5:
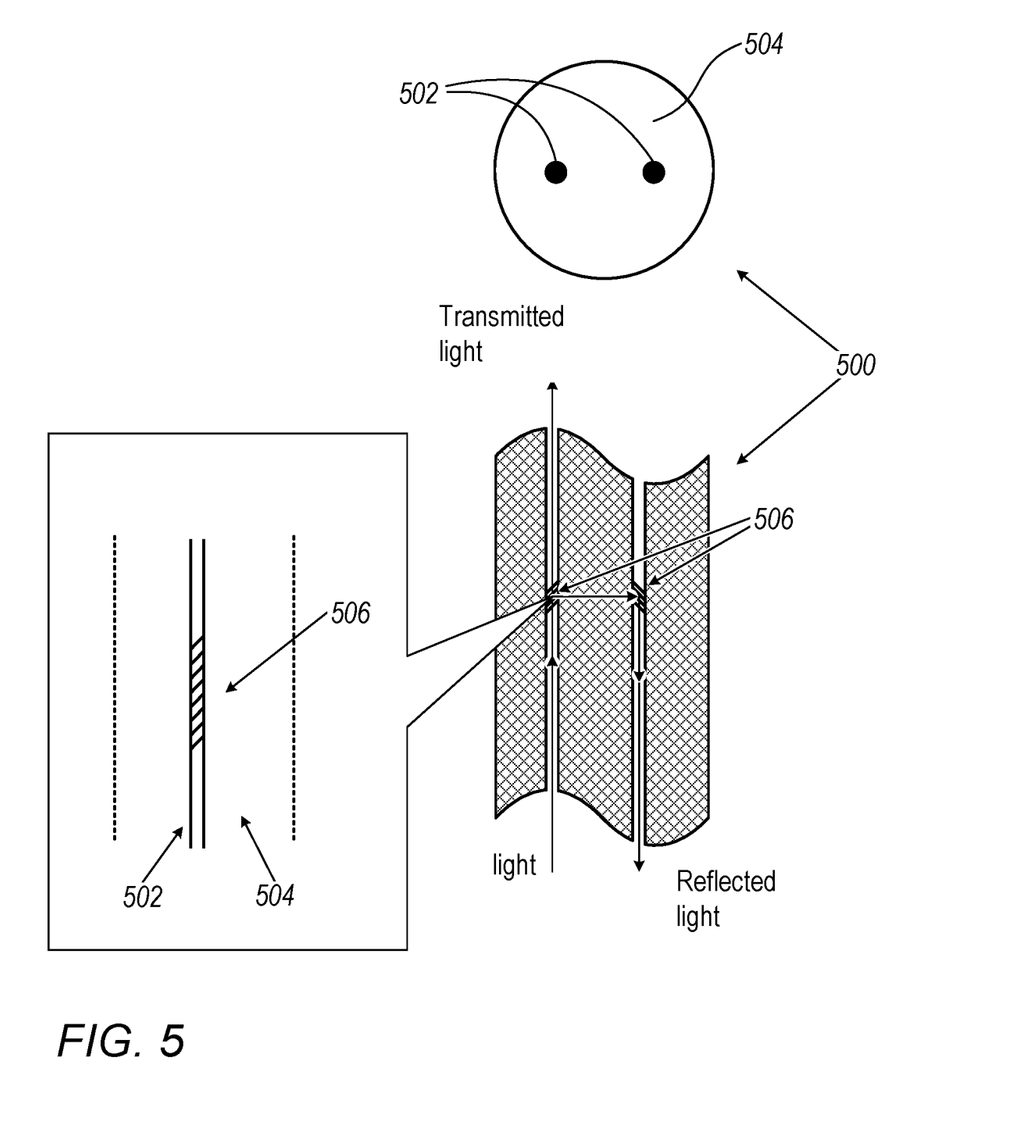
FIG. 5 is block diagram that schematically illustrates tilted fiber Bragg gratings (FBGs) in a dual-core optical fiber, in accordance with an embodiment of the present invention.

Overcoming Rayleigh Noise Using Dual-Core Fiber with Weak Tilted Fbg Arrays in its Cores FIG. 5 is block diagram that schematically illustrates tilted fiber Bragg gratings (FBGs) 506 in a dual-core optical fiber 500, in accordance with an embodiment of the present invention. As seen, dual-core fiber 500 is a specialty fiber that contains two cores 502 embedded in a shared cladding 504. Each of fiber cores 502 can act as a separate waveguide, so that light can independently propagate through these cores.

In the shown embodiment, each core of the two fibers includes a tilted FBG 506 embedded at the same position, such that a small portion of the light propagating in core #1 is reflected to core #2 and then reflected back to the interrogator via the FBG in core #2. These two FBGs create a loop together with the interrogator and constitute an interferometer based on transmission (rather than reflection) and hence eliminates the problem of Rayleigh backscatter noise. It is assumed that double Rayleigh scattering is exceedingly small.

Once a weak FBG array in a multicore fiber is established, each pair of reflectors yields a closed loop and the fiber can be interrogated with a single narrow pulse. A launched pulse (or a coded sequence as described above) into one core of this fiber structure, e.g. core #1, causes a reflection of pulses/sequence at delays that correspond to the round trip time of each loop. By subtracting the optical phase of adjacent reflections, i.e. adjacent FBGs, one can detect the change in the optical phase caused in the specific segment between these two FBG pairs. This detection is in "transmission mode," meaning that there is no use at all of Rayleigh backscattering. The interrogation setup for this method includes a light source and a modulator for the creation of the interrogator pulse, and, for detection, a detector and sampling device (i.e. digitizer, scope, etc.). The light transmission portion of the optical interrogator is connected to core #1 while the detection setup is connected to core #2, thus light that is backscattered from core #1 appears in the light emitter source and does not contribute noise to the signal.

It is noted that the above-described structure of a dual-core fiber with embedded reflectors that reflect light from one core into the other core and back to the interrogator has various applications that are not limited to DAS. Examples of applications include SHM (structural health monitoring), active health monitoring such as aircraft wing monitoring, underwater acoustic sensing, distributed temperature sensing, static strain sensing.

Although the embodiments described herein mainly address sensor networks, the methods and systems described herein can also be used in other applications, such as in low-rate optical communication systems. Several non-limiting examples are agricultural control systems that control agricultural devices such as sprinklers and measure the resulting humidity, and communication systems for use in underground mines (in which wireless communication is often not feasible). Other examples include perimeter sensing for harbor (underwater) and border defense, seismic profiling, transportation monitoring, IOT sensor arrays etc.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
generating a sequence of multiple optical pulses, for transmission into an optical fiber having an array consisting of N equally spaced reflectors embedded therein, the reflectors having a temporal round-trip spacing $T_a$ between adjacent reflectors, the sequence having a pulse duration of $\tau=T_a/(N-1)$ or to $\tau=T_a/(N+1)$ and a pulse repetition interval (PRI) of $N\cdot\tau$, thereby guaranteeing that reflections of any of the optical pulses from any of the reflectors do not overlap;
transmitting the sequence of optical pulses into the optical fiber;
extracting, from the optical fiber, the reflections of the optical pulses from the reflectors; and
identifying one or more events affecting the optical fiber by analyzing the reflections.

2. The method according to claim 1, wherein generating the sequence comprises generating each of the optical pulses as one of a rectangular pulse, a raised-cosine pulse and a Gaussian pulse.

3. The method according to claim 1, wherein generating the sequence comprises generating each of the optical pulses as an antipodal perfect periodic autocorrelation (PPA) sequence, wherein extracting the reflections comprises correlating the reflections with the antipodal PPA sequence, and wherein the pulse duration and the PRI guarantee no overlap among the correlated reflections.

4. The method according to claim 3, wherein generating the sequence comprises setting a number of bits in the antipodal PPA sequence to be at least the number of reflectors in the array.

5. The method according to claim 1, wherein the optical fiber comprises at least first and second cores, wherein transmitting the sequence comprises transmitting the sequence into the first core at a given end of the optical fiber, wherein extracting the reflections comprises extracting the reflections from the second core at the given end of the optical fiber, and wherein the array comprises at least (i) a first reflector embedded in the first core and configured to reflect the optical pulses arriving from the given end, from the first core to the second core, and (ii) a second reflector embedded in the second core and configured to reflect the pulses arriving from the first core to propagate in the second core toward the given end of the optical fiber.

6. The method according to claim 1, wherein identifying the events comprises, for a given event, identifying a reflector associated with the given event.

7. A system, comprising:
an optical transmitter, configured to generate a sequence of multiple optical pulses, for transmission into an optical fiber having an array consisting of N equally spaced reflectors embedded therein, the reflectors having a temporal round-trip spacing $T_a$ between adjacent reflectors, the sequence having a pulse duration of $\tau=T_a/(N-1)$ or to $\tau=T_a/(N+1)$ and a pulse repetition interval (PRI) of $N\cdot\tau$, thereby guaranteeing that reflections of any of the optical pulses from any of the reflectors do not overlap, and to transmit the sequence of optical pulses into the optical fiber;
an optical receiver, configured to extract, from the optical fiber, the reflections of the optical pulses from the reflectors; and a processor, configured to identify one or more events affecting the optical fiber by analyzing the reflections.

8. The system according to claim 7, wherein the optical transmitter is configured to generate each of the optical pulses as one of a rectangular pulse, a raised-cosine pulse and a Gaussian pulse.

9. The system according to claim 7, wherein the optical transmitter is configured to generate each of the optical pulses as an antipodal perfect periodic autocorrelation (PPA) sequence, wherein the optical receiver is configured to correlate the reflections with the antipodal PPA sequence, and wherein the pulse duration and the PRI guarantee no overlap among the correlated reflections.

10. The system according to claim 9, wherein the optical transmitter is configured to generate the sequence by setting a number of bits in the antipodal PPA sequence to be at least the number of reflectors in the array.

11. The system according to claim 7, wherein the optical fiber comprises at least first and second cores, wherein the optical transmitter is configured to transmit the sequence by transmitting the sequence into the first core at a given end of the optical fiber, wherein the optical receiver is configured to extract the reflections by extracting the reflections from the second core at the given end of the optical fiber, and wherein the array comprises at least (i) a first reflector embedded in the first core and configured to reflect the optical pulses arriving from the given end, from the first core to the second core, and (ii) a second reflector embedded in the second core and configured to reflect the pulses arriving from the first core to propagate in the second core toward the given end of the optical fiber.

12. The system according to claim 7, wherein the processor is configured to identify the events by, for a given event, identifying a reflector associated with the given event.

* * * * *